Figure 1:
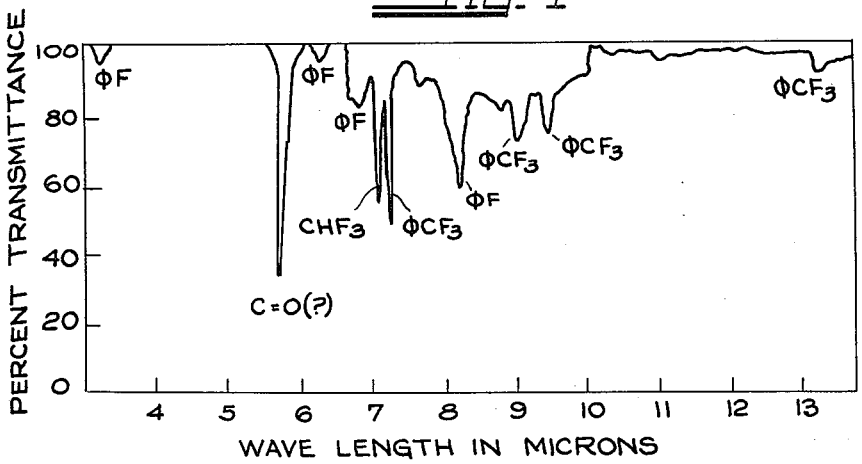

March 12, 1963 PAUL Y. FENG 3,081,243

METHOD OF MAKING FLUORINATED COMPOUNDS

Filed Feb. 27, 1959

YIELD OF $C_6H_5F$ AND $C_6H_5F_3$
AS A FUNCTION OF $CF_4/C_6H_6$

INVENTOR.
PAUL Y. FENG
BY
Albert Siegel
ATT'YS.

United States Patent Office 3,081,243
Patented Mar. 12, 1963

3,081,243
METHOD OF MAKING FLUORINATED COMPOUNDS
Paul Y. Feng, Evanston, Ill., assignor to Armour Research Foundation of Illinois Institute of Technology, Chicago, Ill., a corporation of Illinois
Filed Feb. 27, 1959, Ser. No. 796,126
14 Claims. (Cl. 204—154)

The present invention relates to a novel method of producing fluorine containing organic compounds, and more particularly relates to such method wherein ionizing radiation is utilized to induce the chemical reaction between a number of rather simple fluorine compounds and various organic materials to provide thereby the desirable products resulting from the instant process.

Although there has been a multitude of improvements made in the organic chemistry art relating to the production of chlorinated organic compounds, the addition or substitution of the fluorine atom within such molecules has not met with the degree of success that one would expect from a consideration of the remarkable advances made in the chemistry of organic chlorine compounds. In fact, it is known that fluorinated hydrocarbons, for example, are still not readily obtainable by the interaction of an alcohol with concentrated hydrogen fluoride, in contradistinction to the well-known analogous reaction with hydrogen chloride, whereas, on the other hand, it has been found that more complex or aromatic organic fluorides are likewise not readily producible in a manner analogous to the known chloride processes. Among the practical problems that are faced by the fluoro-chemist are the considerable reactivity and corrosion properties to be overcome when using either fluorine alone or hydrogen fluoride, on one hand, or to attempt to utilize the highly stable fluorine hydrocarbons on the other.

As above indicated, use is made in the instant process of ionizing radiation to induce the formation of organic fluorine compounds. By the term "ionizing radiation" as used herein is meant among others, gamma rays, X-rays, protons, electrons, and other particulate radiation either singly or in combination. In the preferred embodiments hereof gamma rays as provided by spent nuclear reactor fuels or radioactive sources such as cobalt —60 or the like are used.

The most relevant prior art to my invention relates to the chlorination of organic compounds by the utilization of gamma radiation as disclosed in the Russian article by Zimin et al. in Sbornik Rabot Radiatsionni Kim, Akad, Nauk for 1955 at pages 249-260, and as abstracted in volume 50 of Chemical Abstracts, column 4650af(f). It will be evident, however, to those skilled in this particular art that the problems and techniques utilized in the fluorination of organic compounds differ markedly from those in the chlorination procedures.

Accordingly, a primary object of my invention is to provide a novel method utilizing ionizing radiation to form fluorinated organic compounds.

Another, more specific object of my invention is to provide such process to form fluorinated aromatic compounds.

Figure 2:
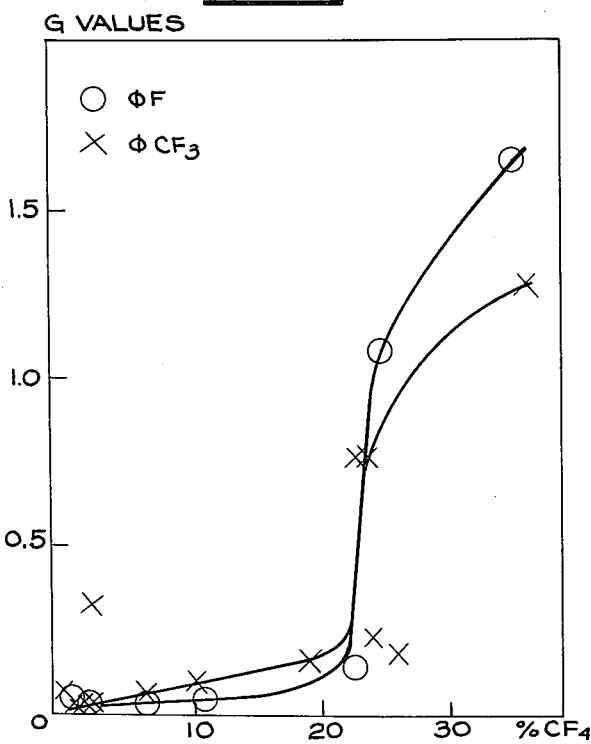

Other objects, features and advantages of my invention will become apparent to those skilled in this particular art from the following detailed disclosures thereof and the attached charts in which:

FIGURE 1 illustrates the infrared spectra of a gamma irradiated $CF_4$—$C_6H_6$ mixture; and FIGURE 2 illustrates the yield of $C_6H_5F$ and $C_6H_5F_3$ as a function of $CF_4/C_6H_6$.

In general, my new process involves the ionizing radiation induced reaction between a fluorine containing compound, as hereinafter disclosed, and an organic material. For purposes of example the reaction between $CF_4$ and $C_6H_6$ will be discussed in detail.

In one example of the instant process a weighed amount of benzene was introduced into a weighed glass irradiation capsule and was then degassed by freezing in liquid nitrogen with concurrent evacuation. Following this a weighed amount of carbon tetrafluoride ($CF_4$) was added to the benzene and the total weight of the loaded capsule was determined to recheck the amounts of reagents contained therein. The capsules thus filled were either then irradiated with gamma rays from a nuclear reactor spent fuel facility, or from a reactor fission gas source or from a cobalt —60 source. Dosages were measured with either ferrous sulfate dosimeters or cobalt glass dosimeters which were standardized against a ferrous sulfate system. After irradiation the liquid portions of the samples were analyzed directly by a Perkin-Elmer Model 21 double beam infrared spectrophotometer.

I found that such irradiation of a benzene-carbon tetrafluoride mixture leads to the formation of various amounts of fluorobenzene ($C_6H_5F$), benzotrifluoride ($C_6H_5F_3$), fluoroform ($CHF_3$) and in some instances small amounts of hydrogen fluoride, the latter as evidenced by the attacks on glass. Thus:

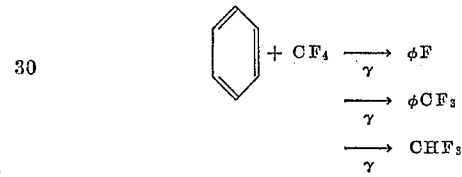

An example of the infrared radiation spectra of the foregoing irradiated system is shown in FIGURE 1. The concentrations of the products in various irradiation mixtures were calculated from the major absorption peaks by comparison with standards and by application of Beer's law and are given in the graph comprising FIGURE 2. The yields of $C_6H_5CF_3$ and $C_6H_5F$ as a function of the overall $CF_4$ to $C_6H_6$ ratio is shown in FIGURE 2. In these cases the yields (G values) are expressed in terms of the number of molecules produced per 100 e.v. of radiation energy absorbed by the whole mixture, and were determined from the absorption spectra by comparison with standard samples and by application of Beer's law. The radiation dosages needed for the yield calculations were based on the ferrous sulfate dosimeter with G=15.6.

Even more specifically, a mixture of 4 grams of benzene and 2.34 grams of carbon tetrafluoride was irradiated as aforedescribed to produce fluorobenzene and benzotrifluoride with a yield of approximately 5 molecules per each 100 electron volts irradiation energy, corresponding to approximately one pound per 1 to 10 kilowatt hours.

In other experimentation I have established that as a first approximation, and under the conditions of the foregoing process, $CF_4$ dissolves in benzene in accordance with Henry's law, and that the G (radical values) of $CF_4$—$C_6H_6$ systems are of the order of 0.7-1.1 as determined by the diphenyl picryl hydrazl (dpph) method described by Prevøst-Bernas et al. in 12 Discussions of the Faraday Society, 102 (1953). Since only a fraction of the radiation produced radicals can combine to form the fluorinated aromatic compounds as a result of competition of other combination processes and since the dpph method normally gives higher G (radical) values than those obtained by other methods, it follows that radical combination reactions cannot be responsible for the observed results. This conclusion, coupled with the knowledge that radical-molecule reactions involving fluorine or carbon trifluoride and benzene lead at best to addition instead of substitution, suggests that other mechanisms, probably involving ionic species, must be operative in the irradiated $CF_4$—$C_6H_6$ system.

A number of other covalently or partially covalently bonded fluorine containing materials may be substituted for the $CF_4$ indicated in the above example. These include $CHF_3$, $CCl_2F_2$, $CCl_3F$, $C_2Cl_2F_2(FClC=ClF)$, $BF_3$, $CH_3CH_2F$, $CH_3$—$CH(F)$—$CH_3$, $S_2F_6$, $CH_2=CF_2$, the fluorides of silicon, phosphorus, arsenic, titanium, antimony and selenium, and other fluorinated hydrocarbons. However, it should be understood ionically bonded fluorides, e.g., NaF, or the strongly basic metal fluorides of groups III, IV and V of the periodic table are inoperative for purposes of the present invention. In addition free diatomic fluorine should likewise not be utilized in the instant process.

In addition to the fluorination of benzene as illustrated above, practically all other organic compounds may be likewise so fluorinated. Even more specifically, but not limited thereto the aromatic compounds toluene, naphthalene, anthracene and xylene and derivatives and mixtures thereof are particularly amenable to fluorination as herein taught.

It will be understood that modifications and variations may be effected without departing from the spirit or scope of the novel concepts of the instant invention.

I claim as my invention:

1. The method of producing fluorinated aromatic compounds comprising the steps of: forming an intimate mixture of an aromatic organic compound and a covalently bonded fluoride compound selected from the group consisting of fluorinated hydrocarbons and fluorides of silicon, phosphorus, boron, arsenic, titanium, sulphur, selenium and mixtures thereof; subjecting such mixture to high energy ionizing radiation, and recovering a fluorinated aromatic compound from the reaction mixture.

2. The method of producing fluorinated aromatic compounds comprising the steps of: forming an intimate mixture of an aromatic organic compound selected from the group consisting of benzene, toluene, naphthalene, anthracene, xylene, and derivatives and mixtures thereof and a covalently bonded compound selected from the group consisting of fluorinated hydrocarbons and fluorides of silicon, phosphorus, boron, arsenic, titanium, sulphur, selenium and mixtures thereof; subjecting such mixture to high energy ionizing radiation and recovering the fluorinated aromatic compound from the reaction mixture.

3. The method as defined in claim 1 wherein said high energy ionizing radiation consists of gamma rays.

4. The method of producing fluorinated aromatic compounds comprising the steps of: forming an intimate mixture of an aromatic organic compound and carbon tetrafluoride; subjecting such mixture to high energy ionizing radiation, and recovering a fluorinated aromatic compound from the reaction mixture.

5. The method as defined in claim 4 wherein said high energy ionizing radiation consists of gamma rays.

6. The method as defined in claim 2 wherein said high energy ionizing radiation consists of gamma rays.

7. The method of producing fluorinated aromatic compounds comprising the steps of: forming an intimate mixture of an aromatic organic compound selected from the group consisting of benzene, toluene, naphthalene, anthracene, xylene, and derivatives and mixtures thereof and carbon tetrafluoride; subjecting such mixture to high energy ionizing radiation, and recovering the fluorinated aromatic compound from the reaction mixture.

8. The method as defined in claim 7 wherein said high energy ionizing radiation consists of gamma rays.

9. The method of producing fluorobenzene comprising the steps of: forming an intimate mixture of benzene and carbon tetrafluoride; subjecting such mixture to high energy ionizing radiation, and separating the fluorobenzene thus produced from the reaction mixture.

10. The method as defined in claim 9 wherein said high energy ionizing radiation consists of gamma rays.

11. The method of producing fluorinated aromatic compounds comprising the steps of: forming an intimate mixture of an aromatic organic compound and a covalently bonded fluorine containing material selected from the group consisting of: $CF_4$, $CHF_3$, $CCl_2F_2$, $CCl_3F$, $C_2Cl_2F_2(FClC=ClF)$, $BF_3$, $CH_3CH_2F$, $CH_3$—$CH(F)$—$CH_3$, $S_2F_6$, $CH_2=CF_2$ and mixtures thereof; subjecting such mixture to high energy ionizing radiation and recovering a fluorinated aromatic compound from the reaction mixture.

12. The method as defined in claim 11 wherein said high energy ionizing radiation consists of gamma rays.

13. The method of producing fluorinated aromatic compounds comprising the steps of: forming an intimate mixture of an aromatic organic compound selected from the group consisting of benzene, toluene, naphthalene, anthracene, xylene and derivatives and mixtures thereof and a covalently bonded fluorine containing material selected from the group consisting of $CF_4$, $CHF_3$, $CCl_2F_2$, $CCl_3F$, $C_2Cl_2F_2(FClC=ClF)$, $BF_3$, $CH_3CH_2F$, $CH_3$—$CH(F)$—$CH_3$, $S_2F_6$, $CH_2=CF_2$ and mixtures thereof; subjecting such mixture to high energy ionizing radiation, and recovering the fluorinated aromatic compound from the reaction mixture.

14. The method as defined in claim 13 wherein said high energy ionizing radiation consists of gamma rays.

References Cited in the file of this patent

UNITED STATES PATENTS

| | | |
|---|---|---|
| 2,436,135 | Barrick et al. | Feb. 17, 1948 |
| 2,709,186 | Farlow et al. | May 24, 1955 |
| 2,743,223 | McClinton et al. | Apr. 24, 1956 |
| 2,880,154 | Borland et al. | Mar. 31, 1959 |

FOREIGN PATENTS

| | | |
|---|---|---|
| 665,263 | Great Britain | Jan. 23, 1952 |

OTHER REFERENCES

Zimin et al.: "Chemical Abstracts," vol. 50, page 4650, Apr. 10, 1956.